（12） United States Patent
Kim et al.

(10) Patent No.: US 8,530,097 B2
(45) Date of Patent: Sep. 10, 2013

(54) ELECTRODE ASSEMBLY INCLUDING FILM-LIKE SEPARATOR COMBINED WITH CERAMIC SEPARATOR AND SECONDARY BATTERY HAVING THE SAME

(75) Inventors: Jin-Hee Kim, Suwon-si (KR); Wan-Mook Lim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 725 days.

(21) Appl. No.: 12/412,802

(22) Filed: Mar. 27, 2009

(65) Prior Publication Data

US 2009/0246614 A1 Oct. 1, 2009

(30) Foreign Application Priority Data

Mar. 27, 2008 (KR) ........................ 10-2008-0028326

(51) Int. Cl.
*H01M 2/16* (2006.01)
(52) U.S. Cl.
USPC ........... 429/249; 429/251; 429/254; 429/142; 429/144; 429/145
(58) Field of Classification Search
USPC ................ 429/247, 248, 249, 251, 252, 142, 429/144, 145, 254, 129
See application file for complete search history.

(56) References Cited

U.S. PATENT DOCUMENTS

| 6,296,969 | B1 * | 10/2001 | Yano et al. ................. 429/145 |
| 6,432,586 | B1 | 8/2002 | Zhang |
| 2005/0070193 | A1 | 3/2005 | Hennige et al. |
| 2006/0194116 | A1 | 8/2006 | Suzuki et al. |
| 2006/0263693 | A1 | 11/2006 | Kim et al. |
| 2007/0009803 | A1 | 1/2007 | Kim et al. |
| 2007/0190404 | A1 | 8/2007 | Hatanaka et al. |
| 2008/0248381 | A1 | 10/2008 | Hennige et al. |
| 2009/0155677 | A1 | 6/2009 | Maeda et al. |

FOREIGN PATENT DOCUMENTS

| CN | 1855584 | 11/2006 |
| EP | 1 146 576 A1 | 10/2001 |
| EP | 1 717 885 A1 | 11/2006 |
| EP | 1 758 199 A2 | 2/2007 |
| JP | 59-214173 | 12/1984 |
| JP | 01-152140 | 6/1989 |
| JP | 7-220759 | 8/1995 |
| JP | 9-245762 | 9/1997 |
| JP | 2000-285966 | 10/2000 |
| JP | 2001-284177 | 10/2001 |
| JP | 2001-345085 | 12/2001 |
| JP | 2004-307711 | 11/2004 |
| JP | 2005-327680 | 11/2005 |
| JP | 2006004873 | 1/2006 |
| JP | 2006-49114 | 2/2006 |
| JP | 2006-310302 | 9/2006 |
| JP | 2007-149467 | 6/2007 |
| JP | 2008-041809 | 2/2008 |
| JP | 2009-146610 | 7/2009 |
| KR | 10-2001-0091048 | 10/2001 |
| KR | 10-2004-0005550 | 1/2004 |
| KR | 10-2004-0050149 | 6/2004 |
| KR | 2007-34038 | 3/2007 |
| WO | WO 03/072231 A2 | 9/2003 |
| WO | WO 03/072231 A3 | 9/2003 |
| WO | 2005029614 | 3/2005 |
| WO | WO 2005/038946 A2 | 4/2005 |

OTHER PUBLICATIONS

Search Report issued in European Patent Application No. 09156343.7 on Jul. 3, 2009.
Korean Notice of Allowance issued on Dec. 31, 2009, in corresponding Korean Patent Application No. 10-2008-0028326.
Yasui Seiki Co., "The Yasui Seiki Micro Gravure™ Coating Method".
Chinese Office Action dated Jul. 13, 2011 in corresponding Chinese Patent Application No. 200910127096.7.
Office Action dated Sep. 27, 2011 in corresponding Japanese Patent Application No. 2009-078480.
Office Action dated May 3, 2012 in corresponding Chinese Patent Application No. 200910127096.7.

* cited by examiner

*Primary Examiner* — Raymond Alejandro
(74) *Attorney, Agent, or Firm* — Knobbe Martens Olson & Bear LLP

(57) ABSTRACT

A secondary battery including an electrode assembly including a positive electrode including a positive electrode active material layer, a negative electrode including a negative electrode active material layer, a separator separating the positive and negative electrodes from each other, and an electrolyte. The separator includes a porous layer comprising a ceramic material and a binder, and a polyolefin-based resin layer. The porous layer has a centerline average roughness (Ra) of 0.3 μm to 1.5 μm, the polyolefin-based resin layer has a porosity of 30% to 60%, and the polyolefin-based resin layer has a compressibility of 4% to 10%.

7 Claims, No Drawings

ELECTRODE ASSEMBLY INCLUDING FILM-LIKE SEPARATOR COMBINED WITH CERAMIC SEPARATOR AND SECONDARY BATTERY HAVING THE SAME

CROSS-REFERENCE TO RELATED APPLICATION

This application claims the benefit of Korean Patent Application No. 2008-28326, filed Mar. 27, 2008, in the Korean Intellectual Property Office, the disclosure of which is incorporated herein by reference.

BACKGROUND OF THE INVENTION

1. Field of the Invention

Aspects of the present invention relate to an electrode assembly and a secondary battery having the same, and more particularly, to a secondary battery capable of ensuring optimal battery safety without diminished performance.

2. Description of the Related Art

In recent years, the rapid development of small and lightweight portable electronic devices has generated an increasing need for high-capacity, small-sized batteries. In particular, lithium ion secondary batteries can provide an operating voltage of at least about 3.6 V, which is about 3 times higher than nickel-cadmium batteries or nickel-hydrogen batteries widely used in portable electronic devices, and lithium ion secondary batteries have a higher energy density per unit weight than nickel-cadmium batteries or nickel-hydrogen batteries. For these reasons, research into lithium ion secondary batteries has rapidly progressed.

In a lithium ion secondary battery, electrical energy is generated due to oxidation and reduction reactions, which occur when lithium ions are intercalated/deintercalated at positive and negative electrodes. Fabrication of the lithium ion secondary battery involves forming positive and negative electrodes out of materials capable of reversibly intercalating/deintercalating lithium ions, and filling an organic electrolyte or polymer electrolyte between the positive and negative electrodes.

The lithium ion secondary battery includes an electrode assembly in which a negative electrode plate and a positive electrode plate, with a separator interposed therebetween, are wound in the form of a jelly-roll, a can that contains the electrode assembly and an electrolyte, and a cap assembly mounted on the can.

Conventionally, for the separator, a single or multiple polyolefin micro-porous polymer layer formed of at least one of polypropylene (PP) and polyethylene (PE) has been used. However, since a polyolefin micro-porous polymer layer that serves as a separator has a sheet or film shape, when heat is generated in a battery due to internal shorting or overcharge, pores may be clogged and the film-type separator may shrink.

Accordingly, when the film-type separator shrinks due to heat generated in the lithium ion secondary battery, portions of the positive and negative electrodes, which are not separated by the shrunk separator, are brought into contact with each other, thereby causing ignition, bursting, or explosion.

In order to overcome these disadvantages of the film-type separator, a considerable amount of research has focused on forming a ceramic separator formed by coating a film-type separator with a porous layer comprising a binder and a ceramic material, such as silica ($SiO_2$), alumina ($Al_2O_3$), zirconium oxide ($ZrO_2$), or titanium oxide ($TiO_2$).

In this case, the ceramic separator may make up for the fusion and shrinkage of a film-type polyolefin separator at a high temperature of about 120° C. or higher. As a result, there is a growing tendency to use both a conventional film-type separator and a ceramic separator.

Generally, the performance of a battery is evaluated in terms of safety and reliability. Charge and discharge cycle characteristics are considered to be the most important factors affecting the reliability of the battery. The length of time that a mobile device can be stably used without interruption of power depends on its capacitance maintenance rate with respect to the number of charge and discharge cycles it has undergone.

While capacitance is generally evaluated based on charge and discharge cycles at room temperature, in order to reproduce extreme conditions, cycle characteristics may be evaluated at a low temperature of 0° C. to 10° C.

However, when a conventional film-like separator is combined with a ceramic separator in a battery, cycle characteristics at low temperature deteriorate.

That is, when a film-like separator is combined with a ceramic separator, battery safety is enhanced but reliability deteriorates.

Therefore, matching a film-like separator with a ceramic separator is important, and it is desirable to optimally design a lithium ion secondary battery so as to ensure its safety without diminishing its reliability.

SUMMARY OF THE INVENTION

Aspects of the present invention provide a lithium ion secondary battery with improved safety without diminished reliability.

Aspects of the present invention also provide a lithium ion secondary battery in which a film-like separator is combined with a ceramic separator, exhibiting excellent cycle characteristics at low temperature.

According to an embodiment of the present invention, an electrode assembly includes: two electrode plates; and a separator separating the two electrode plates, wherein the separator includes a porous layer comprising a ceramic material and a binder, and a polyolefin-based resin layer. The porous layer has a centerline average roughness (Ra) of 0.3 µm to 1.5 µm, the polyolefin-based resin layer has a porosity of 30% to 60%, and the polyolefin-based resin layer has a compressibility of 4% to 10%.

According to another embodiment of the present invention, an electrode assembly includes: a positive electrode including a positive electrode active material layer; a negative electrode including a negative electrode active material layer; and a separator separating the positive and negative electrodes from each other, wherein the separator includes a porous layer comprising a ceramic material and a binder, and a polyolefin-based resin layer. The porous layer has a centerline average roughness (Ra) of 0.3 µm to 1.5 µm, the polyolefin-based resin layer has a porosity of 30% to 60%, and the polyolefin-based resin layer has a compressibility of 4% to 10%.

According to still another embodiment of the present invention, a secondary battery includes: an electrode assembly having a positive electrode including a positive electrode active material layer, a negative electrode including a negative electrode active material layer, and a separator separating the positive and negative electrodes from each other; and an electrolyte, wherein the separator includes a porous layer comprising a ceramic material and a binder, and a polyolefin-based resin layer. The porous layer has a centerline average roughness (Ra) of 0.3 µm to 1.5 µm, the polyolefin-based resin layer has a porosity of 30% to 60%, and the polyolefin-based resin layer has a compressibility of 4% to 10%.

According to an aspect of the present invention, the porous layer may have a ten point average roughness (Rz) of 4 µm to 15 µm.

According to an aspect of the present invention, the separator may be disposed in at least one of the positive electrode including the positive electrode active material layer and the negative electrode including the negative electrode active material layer.

According to an aspect of the present invention, the electrode assembly may be formed by coating the porous layer on the positive electrode active material layer or the negative electrode active material layer and disposing the polyolefin-based resin layer on the porous layer.

According to an aspect of the present invention, the electrode assembly may be formed by disposing the polyolefin-based resin layer on the positive electrode active material layer or the negative electrode active material layer and coating the porous layer onto the polyolefin-based resin layer.

According to another embodiment of the present invention, there is provided an electrode/separator structure comprising an electrode including an electrode active material layer; and a separator including a porous layer comprising a ceramic material and a binder, and a polyolefin-based resin layer formed on the electrode, wherein the porous layer comprising the combination of a ceramic material and the binder is formed on the electrode active material layer of the electrode, wherein the polyolefin-based resin layer is formed on the porous layer, and wherein the porous layer has a centerline average roughness (Ra) of 0.3 µm to 1.5 µm, the polyolefin-based resin layer has a porosity of 30% to 60%, and the polyolefin-based resin layer has a compressibility of 4% to 10%.

According to another embodiment of the present invention, there is provided an electrode/separator structure comprising an electrode including an electrode active material layer; and a separator including a porous layer comprising a ceramic material and a binder, and a polyolefin-based resin layer formed on the electrode, wherein the polyolefin-based resin layer is formed on the electrode active material layer, and the porous layer comprising the combination of the ceramic material and the binder is formed on the polyolefin-based resin layer, and wherein the porous layer has a centerline average roughness (Ra) of 0.3 µm to 1.5 µm, the polyolefin-based resin layer has a porosity of 30% to 60%, and the polyolefin-based resin layer has a compressibility of 4% to 10%.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrode assembly including a separator, and a secondary battery including the same according to aspects of the present invention will be described below. The separator according to aspects of the present invention is formed to include a porous layer and a polyolefin-based resin layer (hereinafter, collectively referred to as a ceramic separator). In other words, the porous layer and the polyolefin-based resin layer function as a separator in the secondary battery.

A polyethylene (PE) layer, a polypropylene (PP) layer, or a multilayer thereof may be used as the polyolefin-based resin layer. However, the polyolefin-based resin layer is not limited to such materials.

The porous layer comprises a ceramic material and a binder. The ceramic material may include at least one selected from the group consisting of silica ($SiO_2$), alumina ($Al_2O_3$), zirconium oxide ($ZrO_2$), and titanium oxide ($TiO_2$). Also, zirconium, aluminum, silicon, titanium and an insulating nitride thereof, a hydroxide thereof, or a mixture thereof may be used as the ceramic material. (The insulating nitride is specified because a conductive nitride, such as titanium nitride (TiN), may not be appropriate for the ceramic material).

The binder may include a synthetic rubber latex binder or an acrylic rubber binder with a crosslinking structure. The synthetic rubber latex binder may include at least one polymer latex selected from the group consisting of styrene butadiene rubber (SBR) latex, nitrile butadiene rubber (NBR) latex, methyl methacrylate butadiene rubber latex, chloroprene rubber latex, carboxylated styrene-butadiene rubber latex, and modified polyorganosiloxane-based polymer latex. The polymer latex may include an aqueous dispersant. 0.1 to 20 parts by weight of a polymer latex solid may be present based on 100 parts by weight of the ceramic material. When less than 0.1 parts by weight polymer latex solid is used, adhesion of the porous layer to an electrode or to the polyolefin-based resin layer may be unreliable. When more than 20 parts by weight polymer latex solid is used, the polymer latex may adversely affect battery characteristics.

Also, the acrylic rubber having a crosslinking structure may be obtained by a crosslinking reaction of a polymer or co-polymer of an acrylic main monomer with a crosslinking co-monomer. When only the polymer or co-polymer of the acrylic main monomer is used, a coupling structure may be weak and easily cut. However, when the polymer or co-polymer of the acrylic main monomer combines with the crosslinking co-monomer due to the cross-linking reaction, a tighter net structure can be formed. As the cross-linking degree increases, it becomes more difficult to swell a polymer having a net structure in a solvent. The acrylic rubber binder having the cross-linking structure may have a 3-dimensional cross-linking structure having 2 to 10 cross-linking points, and more specifically, 4 to 5 cross-linking points, based on 10000 molecular weight units of a main chain molecule. Thus, the acrylic rubber having the cross-linking structure according to aspects of the present invention may have good resistance to swelling in the electrolyte.

The ceramic material may be a material that decomposes at a temperature of about 1000° C. or higher, and the acrylic rubber binder having the cross-linking structure may be a material that decomposes at a temperature of about 250° C. or higher, so that the heat resistance of a secondary battery can be increased to improve battery safety with regard to internal short-circuiting.

The acrylic main monomer may include at least one selected from the group consisting of: an alkoxyalkyl acrylate selected from the group consisting of methoxymethyl acrylate, methoxyethyl acrylate, ethoxyethyl acrylate, butoxyethylacrylate, methoxyethoxyethyl acrylate, and dicyclopentenyloxyethyl acrylate; an alkenyl acrylate or alkenyl methacrylate selected from the group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate, and 3,3-dimethylbutenyl acrylate; an unsaturated dicarboxylic acid ester selected out of divinyl itaconate and divinyl maleate; a vinyl ether selected from the group consisting of vinyl 1,1-dimethylpropenyl ether and vinyl 3,3-dimethylbutenyl ether; 1-acryloyloxy-1-phenylethene; and methyl methacrylate.

The cross-linking co-monomer may include at least one selected from the group consisting of: an alkyl acrylate selected from the group consisting of 2-ethylhexyl acrylate, methyl acrylate, ethyl acrylate, propyl acrylate, butyl acrylate, octyl acrylate, and iso-octyl acrylate; an alkenyl chloroacetate selected from the group consisting of vinyl chloroacetate and acryl chloroacetate; a glycidyl ester or ether selected from the group consisting of glycidyl acrylate, vinylglycidyl ether, and acryl glycidyl ether; an unsaturated carboxylic acid selected from the group consisting of acrylic acid, methacrylic acid, and maleic acid; 2-chloroethyl vinyl ether; chloromethyl styrene; and acrylonitrile.

The porous layer that is formed by the combination of the ceramic material and the binder has a decomposition temperature of 1000° C. or higher, and since a functional binder that has high mechanical, thermal and electrochemical safety is used as the binder used for binding the ceramic material, it is possible to obtain a battery having a high heat resistance and a high safety factor against internal short-circuiting when the binder is used in the battery.

The porous layer that is formed by the combination of the ceramic material and the binder is coated on a positive active material layer or a negative active material layer to be integrally formed with an electrode. Although a conventional film-like polyolefin-based resin layer tends to shrink or melt at a high temperature of 1000° C. or higher, the ceramic material and the binder have excellent heat resistance, and thus even if battery temperature is 1000° C. or higher due to internal short-circuiting, the ceramic material and binder do not shrink or melt.

In a battery using a conventional polyolefin-based resin layer as a separator, after an initial portion of the conventional separator is damaged by initial heating, additional portions adjacent to the damaged portion continue to shrink or melt, thereby increasing the area of the separator that is lost by combustion. Consequently, the conventional battery may suffer from more severe short-circuiting in response to overheating. However, a battery with a separator that includes a porous layer formed by the combination of the ceramic material and the binder as a separator may suffer only slight damage at a location where an internal short circuit occurs, and the short circuit does not extend to a greater area.

The porous layer formed by the combination of the ceramic material and the binder may function as a separator by itself. However, in order to ensure better safety, the conventional polyolefin-based resin layer may also be used. In this case, when the polyolefin-based resin layer does not match well with the porous layer, movement of lithium ions is hindered and the lifespan is worsened.

In particular, an electrolyte may freeze at low temperatures, which results in worse mobility, increased viscosity, and reduced conductivity, so that lithium ion mobility becomes worse as well. These problems become more pronounced as the temperature gets lower. In order to overcome the above and/or other problems, the following factors are taken into account.

Among properties of the separator having an effect on lithium ion mobility, the first to be taken into account is porosity (the degree of being porous). This factor mainly concerns a polyolefin-based resin layer. High porosity facilitates lithium ion mobility, so that charge and discharge cycle characteristics are improved. However, when the porosity is extremely high, the mechanical strength of a separator may be inferior. Thus, a desirable porosity that provides an optimal balance of mechanical strength and lifespan.

Lithium ion mobility is influenced by the amount of electrolyte that a separator absorbs. When the separator does not absorb electrolyte, and the electrolyte remains on its surface, the lithium ions cannot smoothly move through the separator, so that charge capacitance is reduced and cycle characteristics become worse.

The degree to which the separator absorbs the electrolyte depends on porosity. Generally, the higher the porosity, the more electrolyte is absorbed.

However, in the typical secondary battery, it may be difficult to determine the degree of electrolyte absorption based on the porosity of the separator alone, since the positive and negative electrodes are wound with the separator with a predetermined tension in the shape of a jelly-roll to be inserted into a can. As a result, compressibility may be taken into account as another property of a separator having an effect on lithium ion mobility. This factor mainly relates to the polyolefin-based resin layer. A predetermined tension is applied to the separator along with pressure applied by positive and negative electrodes in the battery. Therefore, depending on the amount of the compressibility of the separator, the amount of absorbed electrolyte may vary.

For example, when the porosity of the separator is high, the amount of absorbed electrolyte tends to increase. However, if the compressibility is too high, the absorbed electrolyte may flow out of the separator and worsen its lifespan. Also, the separator may be stretched thinner, thereby lowering the mechanical strength and/or absorption of electrolyte and hence worsening battery safety and capacitance characteristics. In contrast, when the compressibility is extremely low, flexibility is worse, so that a separator film may break or unwind when winding the jelly roll.

As with porosity, there is a desirable compressibility range that provides an optimal balance of mechanical strength and lifespan.

A centerline average roughness (Ra), representing a degree of surface roughness, may also be taken into account as a property of the separator having an effect on lithium ion mobility in the present invention. The term "centerline average roughness (Ra)" refers to a value of average peak height and valley depth with respect to a reference line within a predetermined reference length. This factor mainly relates to the porous layer formed by the combination of the ceramic material and the binder. When surface irregularities of the porous layer are extreme, i.e., the centerline average roughness is high, the film-like polyolefin-based resin layer of the separator may be scratched or pierced. On the other hand, when surface irregularities of the porous layer are insignificant, i.e., the centerline average roughness is low, absorption of electrolyte is lowered. As with porosity and compressibility, there is a desirable surface roughness (centerline average roughness (Ra)) range of the porous layer formed by the combination of the ceramic material and the binder. Consequently, according to aspects of the present invention, the porous layer formed by the combination of the ceramic material and the binder, and the polyolefin-based resin layer are used as the separator. The porous layer formed by the combination of the ceramic material and the binder may have a desirable centerline average roughness (Ra), and the polyolefin-based resin layer may have a desirable porosity and an optimal compressibility.

The centerline average roughness (Ra) of the porous layer may be adjusted by the method provided below. In the present embodiment, the porous layer may be coated using a Micro Gravure roll, but other methods may be used.

Factors that can be adjusted to control the surface roughness of the porous layer are the shape and material of a coating roll, the volume of the Micro Gravure roll, the rotational speed of the Micro Gravure roll, and the speed of a coating line.

The shape and material of the coating roll are basic factors for adjusting the surface roughness. Depending on a roll pattern, e.g., a left oblique line, a right oblique line, a rhombus, a regular square, a rectangle, a triangle, a trapezoid, a diamond shape, a lattice, a waffle, a pyramid, etc., a desired shape may be formed, and the surface roughness may be adjusted. In addition, by deepening a groove in the roll pattern, more ceramic slurry can be applied. As a result, the porous layer can be made thicker and denser. Also, the material of the roll surface may be ceramic such as alumina, zirconia, etc., and depending on the material of the roll, the surface roughness may be adjusted.

Further, the greater the volume of the Micro Gravure roll, the thicker and rougher the coating, and the faster the rotational speed of the Micro Gravure roll, the thicker and rougher the coating.

Also, the faster the speed of the coating line, the more easily a pin-hole is formed, and the rougher a coating becomes.

As non-limiting examples, the centerline average roughness (Ra) of the porous layer formed by the combination of the ceramic material and the binder may be 0.3 µm to 1.5 µm, the porosity of the polyolefin-based resin layer may be 30% to 60%, and the compressibility of the polyolefin-based resin layer may be 4% to 10%.

When the centerline average roughness is less than 0.3 µm, the surface may be so smooth that absorption of electrolyte is not facilitated, and thus cycle characteristics of the battery at low temperature may be inferior. Further, when the centerline average roughness exceeds 1.5 µm, the surface may be rough enough to scratch and even pierce a surface of the polyolefin-based resin layer.

Ten point average roughness (Rz) is another value to express surface roughness, along with centerline average roughness (Ra). The term "ten point average roughness (Rz)" refers to a value calculated by summing the highest 5 peaks and the deepest 5 valleys along a reference line and dividing by 10.

Since the centerline average roughness (Ra) is calculated by taking the overall average of peaks and valleys along a reference line, the centerline average roughness (Ra) may represent macro surface roughness. On the other hand, since the ten point average roughness (Rz) is calculated by selecting the highest peaks and the highest valleys, the ten point average roughness (Rz) may represent micro surface roughness.

That is, even if the centerline average roughness (Ra) falls within the desirable limits, a high ten point average roughness (Rz) value indicates that high peaks and deep valleys are present and that the surface is rough. In contrast, a low ten point average roughness (Rz) value indicates that there are only low peaks and shallow valleys and so absorption of electrolyte may be inferior. According to aspects of the present invention, the ten point average roughness (Rz) of the porous layer may be 4 µm to 15 µm.

When the porosity is less than 30%, pores may be too small and thus, resistance may be high, or the amount of absorbed electrolyte may be too small for lithium ions to actively move so that cycle characteristics at low temperature become worse. Alternatively, when the porosity exceeds 60%, the mechanical strength of the separator becomes worse. As a result, the separator may break or stretch from tension when jelly-roll winding, so that a pass yield becomes worse.

In addition, when the compressibility is less than 4%, the separator film of the polyolefin-based resin layer exhibits inferior elasticity and flexibility, which results in unwinding when winding the jelly roll, so that a pass yield deteriorates. Alternatively, when the compressibility exceeds 10%, the separator may be excessively stretched by tension when the jelly roll is manufactured, so that battery safety may be degraded. In particular, since the separator film of the polyolefin-based resin layer is compressed to be extremely thin, the polyolefin-based resin layer has little space to absorb electrolyte and thus cycle characteristics at low temperature may become worse.

The positive electrode of the electrode assembly may include a positive electrode active material that is capable of reversibly intercalating and deintercalating lithium ions. Typical examples of the positive electrode active material may include lithium-transitional metal oxides, such as $LiCoO_2$, $LiNiO_2$, $LiMnO_2$, $LiMn_2O_4$, and $LiNi_{1-x-y}Co_xM_yO_2$ ($0 \leq x \leq 1$, $0 \leq y \leq 1$, $0 \leq x+y \leq 1$, M is a metal, such as Al, Sr, Mg, or La). However, the present invention is not limited to the above-described positive electrode active materials.

The negative electrode of the electrode assembly may include a negative electrode active material that is capable of reversibly intercalating and deintercalating lithium ions. The negative electrode active material may include a carbon-based negative electrode active material, such as crystalline or amorphous carbon or a carbon composite. However, the present invention is not limited to the above-described negative electrode active materials.

The positive and negative electrodes may further include a conductive material to improve electroconductivity. The conductive material may use at least one selected from the group consisting of a graphite-based conductive material, a carbon black-based conductive material, and a metal or metal compound conductive material. As non-limiting examples, the graphite-based conductive material may be artificial graphite or natural graphite, the carbon black-based material may be acetylene black, ketjen black, denka black, thermal black, or channel black, and the metal or metal compound conductive material may be perovskite such as tin oxide, tin phosphate ($SnPO_4$), titanium oxide, potassium titanate, $LaSrCoO_3$, and $LaSrMnO_3$.

A binder for the electrode active material is a component that binds the active components into a paste, bonds the active materials together and to the collectors, and buffers the swelling and contraction of the active materials. For example, the binder includes polyvinylidene fluoride, copolymer (P(VdF/HFP)) of polyhexafluoropropylene-polyvinylidene fluoride, poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinylpyridine, styrene-butadiene rubber, acrylonitrile-butadiene rubber, etc. The amount of the binder is 0.1 wt % to 30 wt %, and may be 1 wt % to 10 wt % with respect to the electrode active material. When the content of the binder is too low, the bonding force between the electrode active material and a collector may not be strong enough. However, when the content of the binder is too high, the bonding force is strong but the amount of the active material is relatively reduced, which may be disadvantageous for high battery capacity.

A solvent that is used for dispersing the electrode active material, the binder and a conductive material may be a nonaqueous solvent or an aqueous solvent. The non-aqueous solvent may be N-methyl-2-pyrrolidone (NMP), dimethyl formamide, dimethyl acetamide, N,N-dimethylamino propylamine, ethylene oxide, tetrahydrofuran, etc.

Also, the positive electrode may include a positive electrode collector, which may be formed of aluminum (Al) or an Al alloy. The negative electrode may include a negative electrode collector, which may be formed of copper (Cu) or a Cu alloy. Each of the positive and negative electrode collectors may be provided in the form of a foil, a film, a sheet, a punched structure, a porous structure, or a foam structure.

As described above, a porous layer and a polyolefin-based resin layer function as a separator in a secondary battery according to aspects of the present invention. The porous layer and the polyolefin-based resin layer may be formed on the positive electrode, the negative electrode, or both electrodes, when both electrodes are stacked or wound to form an electrode assembly.

After the porous layer is coated onto the positive electrode active material layer or the negative electrode active material layer, the polyolefin-based resin layer is disposed on the porous layer. Alternatively, the polyolefin-based resin layer may be disposed on the positive electrode active material layer or the negative electrode active material layer, and then the porous layer may be coated on the polyolefin-based resin layer. The sequence of stacking the porous layer and the polyolefin-based resin layer in the present invention is not limited.

The electrolyte of a secondary battery including the separator describe above may contain a nonaqueous organic solvent. The nonaqueous organic solvent may include a carbonate, an ester, an ether, or a ketone. Examples of the carbonate include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC). Examples of the ester include butyrolactone (BL), decanolide, valerolactone, mevalonolactone, caprolactone, n-methyl acetate, n-ethyl acetate, or n-propyl acetate. An example of the ether is dibutyl ether. An example of the ketone is polymethylvinyl ketone. However, the present invention is not limited to the above-described nonaqueous organic solvents.

When the nonaqueous organic solvent is a carbonate organic solvent, a mixture of a cyclic carbonate and a chain carbonate may be used as the nonaqueous organic solvent. In this case, the cyclic carbonate may be mixed with the chain carbonate in a volume ratio of 1:1 to 1:9, and more specifically, a volume ratio of 1:1.5 to 1:4, in order to obtain good electrolyte performance.

The electrolyte according to aspects of the present invention may be obtained by adding an aromatic hydrocarbon organic solvent to the carbonate solvent. The aromatic hydrocarbon organic solvent may include an aromatic hydrocarbon compound. Examples of the aromatic hydrocarbon organic solvent include benzene, fluorobenzene, chlorobenzene, nitrobenzene, toluene, fluorotoluene, trifluorotoluene, or xylene. When the electrolyte further contains the aromatic hydrocarbon organic solvent, the carbonate organic solvent may be mixed with the aromatic hydrocarbon organic solvent in a volume ratio of 1:1 to 30:1, in order to obtain good electrolyte performance.

Furthermore, the electrolyte according to the present invention may contain lithium salts, which function as a source of lithium ions, to enable basic operation of the lithium ion secondary battery. For example, the lithium salts may include one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LaAlCl_4$, $LiN(C_xF_{2x+1}SO_2)(CyF_{2y+1}SO_2)$ (here, x and y are natural numbers), $LiSO_3CF_3$, and a mixture thereof.

The lithium salts may be used in a concentration of about 0.6 to 2.0M, more specifically, 0.7 to 1.6M. When the concentration of the lithium salts is less than 0.6M, the electrolyte may have low conductivity and may not exhibit good performance. When the concentration of the lithium salts is more than 2.0M, the electrolyte may have a high viscosity, which reduces lithium ion mobility.

The separator according to aspects of the present invention is interposed between the positive and negative electrodes, and the positive and negative electrodes are stacked, or both stacked and wound, to form an electrode assembly. Thereafter, the electrode assembly is injected into and contained in a can or similar case, thereby completing fabrication of the lithium ion secondary battery.

Further, the shape of the secondary battery formed using the above method is not limited and may be, for example, cylindrical, prismatic, or pouch-shaped.

Exemplary embodiments of the present invention, which do not limit the scope of the invention, and comparative examples will be described below.

Embodiment 1

$LiCoO_2$ as a positive electrode active material, polyvinylidene fluoride (PVDF) as a binder, and carbon as a conductive agent were mixed in a weight ratio of 92:4:4 and dispersed in N-methyl-2-pyrrolidone, thereby producing positive electrode slurry. The positive electrode slurry was coated onto a 20 μm-thick aluminum foil, dried, and rolled to form a positive electrode. Artificial graphite as a negative electrode active material, styrene-butadiene rubber as a binder, and carboxymethylcellulose (CMC) as a viscosity agent were mixed in a weight ratio of 96:2:2 and dispersed in water, thereby producing negative electrode slurry. The negative electrode slurry was coated onto a 15 μm-thick copper foil, dried, and rolled to form a negative electrode.

A separator including a porous layer, which was formed of a ceramic material (alumina) and a binder (butyl acrylate), and a polyolefin-based resin layer (PP) was interposed between the positive and negative electrodes. The positive and negative electrodes with the porous layer interposed therebetween were wound, compressed, and inserted into a cylindrical can.

Thereafter, an electrolyte was injected into the cylindrical can to complete fabrication of a lithium ion secondary battery.

The centerline average roughness (Ra) of the porous layer was 0.5 μm the porosity of the polyolefin-based resin layer was 30%, and the compressibility of the polyolefin-based resin layer was 5%.

In the present Embodiments, a Micro Gravure roll formed of alumina in the shape of an oblique line was used to coat the porous layer and to adjust the surface roughness. The volume of the roll was 10, 20, and 30 cc/m$^2$, and the speed of the coating line was 2, 5, 10 and 20 m/min. In addition, the rotational speed of the roll was adjusted to 10, 20, 30 and 50 rpm to adjust the surface roughness.

The centerline average roughness (Ra) of the porous layer, the porosity of the polyolefin-based resin layer and the compressibility of the polyolefin-based resin layer were measured using the following methods, which are non-limiting examples. It is to be understood that other methods of measuring centerline average roughness (Ra), porosity and compressibility may be used.

The centerline average roughness (Ra) of the porous layer can be measured by an Optical 3D Profiling System. While there are various methods of measurement, they all produce similar absolute values of the roughness. In the present Embodiments and Comparative examples, the measurement was performed using NT2000 optical profiler manufactured by Veeco, and the centerline average roughness (Ra) was used as an index representing roughness. Another index, ten point average roughness (Rz) representing roughness may be used as well.

The porosity of the polyolefin-based resin layer was measured by a mercury porosimeter (manufactured by: MICROMERITICS INSTRUMENT CORPORATION, Model: AutoPore IV 9500 Series).

The compressibility of the polyolefin-based resin layer was measured by cutting a separating film having a thickness of 10 μm to 25 μm into 5 cm by 5 cm pieces and stacking the pieces in a pile of ten films. Then, the stacks were compressed at a pressure of 4 bar and the compressed thickness was measured. The compressibility was expressed as a percentage (%) decrease with respect to the initial thickness.

Embodiment 2

The same process as in Embodiment 1 was performed except that the porosity of the polyolefin-based resin layer was 40%.

Embodiment 3

The same process as in Embodiment 1 was performed except that the porosity of the polyolefin-based resin layer was 50%.

Embodiment 4

The same process as in Embodiment 1 was performed except that the porosity of the polyolefin-based resin layer was 60%.

Embodiment 5

The same process as in Embodiment 1 was performed except that the porosity of the polyolefin-based resin layer was 40% and the compressibility of the polyolefin-based resin layer was 4%.

Embodiment 6

The same process as in Embodiment 1 was performed except that the porosity of the polyolefin-based resin layer was 40% and the compressibility of the polyolefin-based resin layer was 6%.

Embodiment 7

The same process as in Embodiment 1 was performed except that the porosity of the polyolefin-based resin layer was 40% and the compressibility of the polyolefin-based resin layer was 8%.

Embodiment 8

The same process as in Embodiment 1 was performed except that the porosity of the polyolefin-based resin layer was 40% and the compressibility of the polyolefin-based resin layer was 10%.

Embodiment 9

The same process as in Embodiment 1 was performed except that the centerline average roughness of the porous layer was 0.3 μm and the porosity of the polyolefin-based resin layer was 40%.

Embodiment 10

The same process as in Embodiment 1 was performed except that the centerline average roughness of the porous layer was 0.6 μm and the porosity of the polyolefin-based resin layer was 40%.

Embodiment 11

The same process as in Embodiment 1 was performed except that the centerline average roughness of the porous layer was 0.9 μm and the porosity of the polyolefin-based resin layer was 40%.

Embodiment 12

The same process as in Embodiment 1 was performed except that the centerline average roughness of the porous layer was 1.2 μm and the porosity of the polyolefin-based resin layer was 40%.

Embodiment 13

The same process as in Embodiment 1 was performed except that the centerline average roughness of the porous layer was 1.5 μm and the porosity of the polyolefin-based resin layer was 40%.

Comparative Example 1

The same process as in Embodiment 1 was performed except that the porosity of the polyolefin-based resin layer was 10%.

Comparative Example 2

The same process as in Embodiment 1 was performed except that the porosity of the polyolefin-based resin layer was 20%.

Comparative Example 3

The same process as in Embodiment 1 was performed except that the porosity of the polyolefin-based resin layer was 25%.

Comparative Example 4

The same process as in Exemplary Embodiment 1 was performed except that the porosity of the polyolefin-based resin layer was 65%.

Comparative Example 5

The same process as in Embodiment 1 was performed except that the porosity of the polyolefin-based resin layer was 70%.

Comparative Example 6

The same process as in Embodiment 1 was performed except that the porosity of the polyolefin-based resin layer was 40% and the compressibility of the polyolefin-based resin layer was 1%.

Comparative Example 7

The same process as in Embodiment 1 was performed except that the porosity of the polyolefin-based resin layer was 40% and the compressibility of the polyolefin-based resin layer was 2%.

Comparative Example 8

The same process as in Embodiment 1 was performed except that the porosity of the polyolefin-based resin layer was 40% and the compressibility of the polyolefin-based resin layer was 3%.

Comparative Example 9

The same process as in Embodiment 1 was performed except that the porosity of the polyolefin-based resin layer was 40% and the compressibility of the polyolefin-based resin layer was 11.

Comparative Example 10

The same process as in Embodiment 1 was performed except that the porosity of the polyolefin-based resin layer was 40% and the compressibility of the polyolefin-based resin layer was 13%.

Comparative Example 11

The same process as in Embodiment 1 was performed except that the porosity of the polyolefin-based resin layer was 40% and the compressibility of the polyolefin-based resin layer was 15%.

Comparative Example 12

The same process as in Embodiment 1 was performed except that the centerline average roughness of the porous layer was 0.1 μm and the porosity of the polyolefin-based resin layer was 40%.

Comparative Example 13

The same process as in Embodiment 1 was performed except that the centerline average roughness of the porous layer was 0.2 μm and the porosity of the polyolefin-based resin layer was 40%.

Comparative Example 14

The same process as in Embodiment 1 was performed except that the centerline average roughness of the porous layer was 1.8 μm and the porosity of the polyolefin-based resin layer was 40%.

Comparative Example 15

The same process as in Embodiment 1 was performed except that the centerline average roughness of the porous layer was 2.5 μm and the porosity of the polyolefin-based resin layer was 40%.

Comparative Example 16

The same process as in Embodiment 1 was performed except that the centerline average roughness of the porous layer was 3.0 μm and the porosity of the polyolefin-based resin layer was 40%.

The lithium batteries of exemplary embodiments 1 to 13 and comparative examples 1 to 16 were inspected for defects by inspecting the polyolefin-based resin layer. When no assembly defects were found, the battery was marked "OK." When assembly defects were found, the battery was marked to indicate the particular defect.

Also, low-temperature (0° C.) $100^{th}$ cycle characteristics of the lithium battery of Embodiments 1 to 13 and Comparative examples 1 to 16 were measured. Here, 100 charge and discharge cycles were performed at a charge/discharge speed of 1 C and a temperature of 0° C. and the retention of capacitance in the $100^{th}$ cycle compared with the initial stage was indicated as a percentage. Further, when the capacitance after the $100^{th}$ cycle exceeded 50%, the battery was designated as "OK", and when the capacity was lower than 50%, the battery was designated as "NG".

The measured results are listed in the following Table 1.

TABLE 1

| Identification | Polyolefin-based resin layer | | Porous layer | Presence of Assembly Defects | $100^{th}$ Cycle Characteristics at Low Temperature | |
|---|---|---|---|---|---|---|
| | Porosity (%) | Compressibility (%) | Ra Value (μm) | | Retention of capacitance (%) | Determination |
| Embodiment 1 | 30 | 5 | 0.5 | OK | 50 | OK |
| Embodiment 2 | 40 | 5 | 0.5 | OK | 55 | OK |
| Embodiment 3 | 50 | 5 | 0.5 | OK | 62 | OK |
| Embodiment 4 | 60 | 5 | 0.5 | OK | 64 | OK |
| Embodiment 5 | 40 | 4 | 0.5 | OK | 68 | OK |
| Embodiment 6 | 40 | 6 | 0.5 | OK | 70 | OK |
| Embodiment 7 | 40 | 8 | 0.5 | OK | 67 | OK |
| Embodiment 8 | 40 | 10 | 0.5 | OK | 65 | OK |
| Embodiment 9 | 40 | 5 | 0.3 | OK | 56 | OK |
| Embodiment 10 | 40 | 5 | 0.6 | OK | 57 | OK |
| Embodiment 11 | 40 | 5 | 0.9 | OK | 58 | OK |
| Embodiment 12 | 40 | 5 | 1.2 | OK | 61 | OK |
| Embodiment 13 | 40 | 5 | 1.5 | OK | 63 | OK |
| Comparative example 1 | 10 | 5 | 0.5 | OK | 5 | NG |

TABLE 1-continued

| Identification | Polyolefin-based resin layer | | Porous layer | | 100th Cycle Characteristics at Low Temperature | |
|---|---|---|---|---|---|---|
| | Porosity (%) | Compressibility (%) | Ra Value (μm) | Presence of Assembly Defects | Retention of capacitance (%) | Determination |
| Comparative example 2 | 20 | 5 | 0.5 | OK | 6 | NG |
| Comparative example 3 | 25 | 5 | 0.5 | OK | 7 | NG |
| Comparative example 4 | 65 | 5 | 0.5 | Broken separator | 42 | NG |
| Comparative example 5 | 70 | 5 | 0.5 | Broken separator | 33 | NG |
| Comparative example 6 | 40 | 1 | 0.5 | Unwound separator | 20 | NG |
| Comparative example 7 | 40 | 2 | 0.5 | Unwound separator | 19 | NG |
| Comparative example 8 | 40 | 3 | 0.5 | Unwound separator | 18 | NG |
| Comparative example 9 | 40 | 11 | 0.5 | OK | 9 | NG |
| Comparative example 10 | 40 | 13 | 0.5 | OK | 8 | NG |
| Comparative example 11 | 40 | 15 | 0.5 | OK | 7 | NG |
| Comparative example 12 | 40 | 5 | 0.1 | OK | 10 | NG |
| Comparative example 13 | 40 | 5 | 0.2 | OK | 9 | NG |
| Comparative example 14 | 40 | 5 | 1.8 | Scratched separator | 22 | NG |
| Comparative example 15 | 40 | 5 | 2.5 | Scratched separator | 30 | NG |
| Comparative example 16 | 40 | 5 | 3.0 | Scratched separator | 35 | NG |

Referring to Table 1, first, in Embodiments 1 to 4, the compressibility of the polyolefin-based resin layer was fixed at 5%, the roughness of the porous layer was fixed at 0.5 μm and the porosity of the polyolefin-based resin layer was varied. As a result, when the porosity ranged from 30% to 60%, excellent cycle characteristics at low temperature were exhibited.

Also, in Embodiments 5 to 8, the porosity of the polyolefin-based resin layer was fixed at 40%, the roughness of the porous layer was fixed at 0.5 μm, and the compressibility of the polyolefin-based resin layer was varied. As a result, when the compressibility ranged from 4% to 10%, excellent cycle characteristics at low temperature were exhibited.

In addition, in Embodiments 9 to 13, the porosity of the polyolefin-based resin layer was fixed at 5%, the compressibility of the polyolefin-based resin layer was fixed at 5%, and the roughness of the porous layer was varied. As a result, when the roughness ranged from 0.3 μm to 1.5 μm, excellent cycle characteristics at low temperature were exhibited.

Meanwhile, in Comparative examples 1 to 5, the compressibility of the polyolefin-based resin layer was fixed at 5%, the roughness of the porous layer was fixed at 0.5 μm, and the porosity of the polyolefin-based resin layer was varied. When the porosity was less than 30%, lithium ion mobility was degraded so that cycle characteristics at a low temperature were worse. When the porosity exceeded 60%, mechanical strength of the separator was worsened so that the separator broke due to tension when winding the jelly roll.

Furthermore, in Comparative examples 6 to 11, the porosity of the polyolefin-based resin layer was fixed at 40%, the roughness of the porous layer was fixed at 0.5 μm, and the compressibility of the polyolefin-based resin layer was varied. When the compressibility was less than 4%, elasticity and flexibility of the separator film were degraded so that the separator film came unwound when winding the jelly roll. When compressibility exceeded 10%, the separator film became so thin that there was little space to absorb electrolyte and cycle characteristics at low temperature were inferior.

Moreover, in Comparative examples 12 to 16, the porosity of the polyolefin-based resin layer was fixed at 5%, the compressibility of the polyolefin-based resin layer was fixed at 5%, and the roughness of the porous layer was varied. When the roughness was less than 0.3 μm, the surface of the porous layer was smooth so that it could not be saturated by the electrolyte and cycle characteristics at low temperature were inferior. When the roughness exceeded 1.5 μm, the surface of the porous layer was so rough that the separator film was scratched.

The centerline average roughness (Ra) of the porous layer comprising a ceramic material and a binder may be 0.3 μm to 1.5 μm, a porosity of the polyolefin-based resin layer may be 30% to 60%, and a compressibility of the polyolefin-based resin layer may be 4% to 10%. As a result, battery safety can be ensured without diminishing the battery performance. In particular, a secondary battery with no assembly defects and excellent cycle characteristics at low temperature can be provided.

Accordingly, an electrode assembly and lithium ion secondary battery that is very safe and has undiminished performance can be provided according to aspects of the present invention.

Also, a secondary battery with no assembly defects and excellent cycle characteristics at low temperature can be provided according to aspects of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising:
   an electrode assembly comprising a positive electrode including a positive electrode active material layer, a negative electrode including a negative electrode active material layer, and a separator separating the positive and negative electrodes from each other; and
   an electrolyte,
   wherein the separator includes a porous layer comprising a ceramic material and a binder, and a polyolefin-based resin layer, wherein the ceramic material includes at least one selected from the group consisting of silica ($SiO_2$), alumina ($Al_2O_3$), zirconium oxide ($ZrO_2$), and titanium oxide ($TiO_2$), and wherein the sol olefin-based resin layer is a polyethylene (PE) single layer, a polypropylene (PP) single layer, or a polypropylene-polyethylene-polypropylene multilayer,
   wherein the porous layer has a centerline average roughness (Ra) of 0.3 μm to 1.5 μm, the polyolefin-based resin layer has a porosity of 30% to 60%, and the polyolefin-based resin layer has a compressibility of 4% to 10%.

2. The secondary battery according to claim 1, wherein the ceramic material includes at least one selected from the group consisting of an insulating nitride, a hydroxide, and a ketone of at least one selected from the group consisting of zirconium, aluminum, silicon, and titanium, and a mixture thereof.

3. The secondary battery according to claim 1, wherein the porous layer has a ten point average roughness (Rz) of 4 μm to 15 μm.

4. The secondary battery according to claim 1, wherein the separator is disposed on at least one of the positive electrode including the positive electrode active material layer and the negative electrode including the negative electrode active material layer.

5. The secondary battery according to claim 1, wherein the electrode assembly is formed by coating the porous layer onto the positive electrode active material layer or the negative electrode active material layer and disposing the polyolefin-based resin layer on the porous layer.

6. The secondary battery according to claim 1, wherein the electrode assembly is formed by disposing the polyolefin-based resin layer on the positive electrode active material layer or the negative electrode active material layer and coating the porous layer onto the polyolefin-based resin layer.

7. The secondary battery according to claim 1, wherein the electrolyte contains a nonaqueous organic solvent and a lithium salt.

* * * * *